United States Patent [19]

Fort et al.

[11] 4,311,501

[45] Jan. 19, 1982

[54] METHOD AND APPARATUS FOR THE PRODUCTION OF PREFORMS FOR OPTICAL FIBRES

[75] Inventors: Francois Fort; Pierre Zimmermann, both of Paris, France

[73] Assignee: Societe Anonyme dite: les Editions Filmees, Paris, France

[21] Appl. No.: 129,344

[22] Filed: Mar. 11, 1980

Related U.S. Application Data

[63] Continuation-in-part of Ser. No. 50,142, Jun. 19, 1979, abandoned.

[30] Foreign Application Priority Data

Jun. 23, 1978 [FR] France ............................... 78 18892
Jun. 19, 1979 [FR] France ............................... 80 00412

[51] Int. Cl.³ ............................................. C03C 25/02
[52] U.S. Cl. ..................................... 65/3.11; 65/11.1; 65/13; 65/18.3; 65/144
[58] Field of Search .................. 65/3 A, 11 W, 18, 13, 65/144, 3.11, 11.1, 18.3

[56] References Cited

U.S. PATENT DOCUMENTS 4,173,459 11/1979 Aulich .................................. 65/3 A

FOREIGN PATENT DOCUMENTS 2414008 10/1974 Fed. Rep. of Germany .
2447353  4/1976 Fed. Rep. of Germany .
2545273  4/1977 Fed. Rep. of Germany .
2637937  2/1978 Fed. Rep. of Germany ....... 65/3 A
2637937  3/1978 Fed. Rep. of Germany .
2645375  4/1978 Fed. Rep. of Germany .

Primary Examiner—Robert L. Lindsay, Jr.
Attorney, Agent, or Firm—Poms, Smith, Lande & Rose

[57] ABSTRACT

A method for the production of a preform with a view to obtain an optical fibre with index jump or gradient, consisting in spreading over a substrate, a solution of doped transparent substance, the said substrate being simultaneously driven in rotation about its axis and heated; the solution is spread over successive parts of the substrate, and each part starts being heated when the solution is being spread thereon.

The present invention finds an application in the production of silica preforms.

10 Claims, 2 Drawing Figures

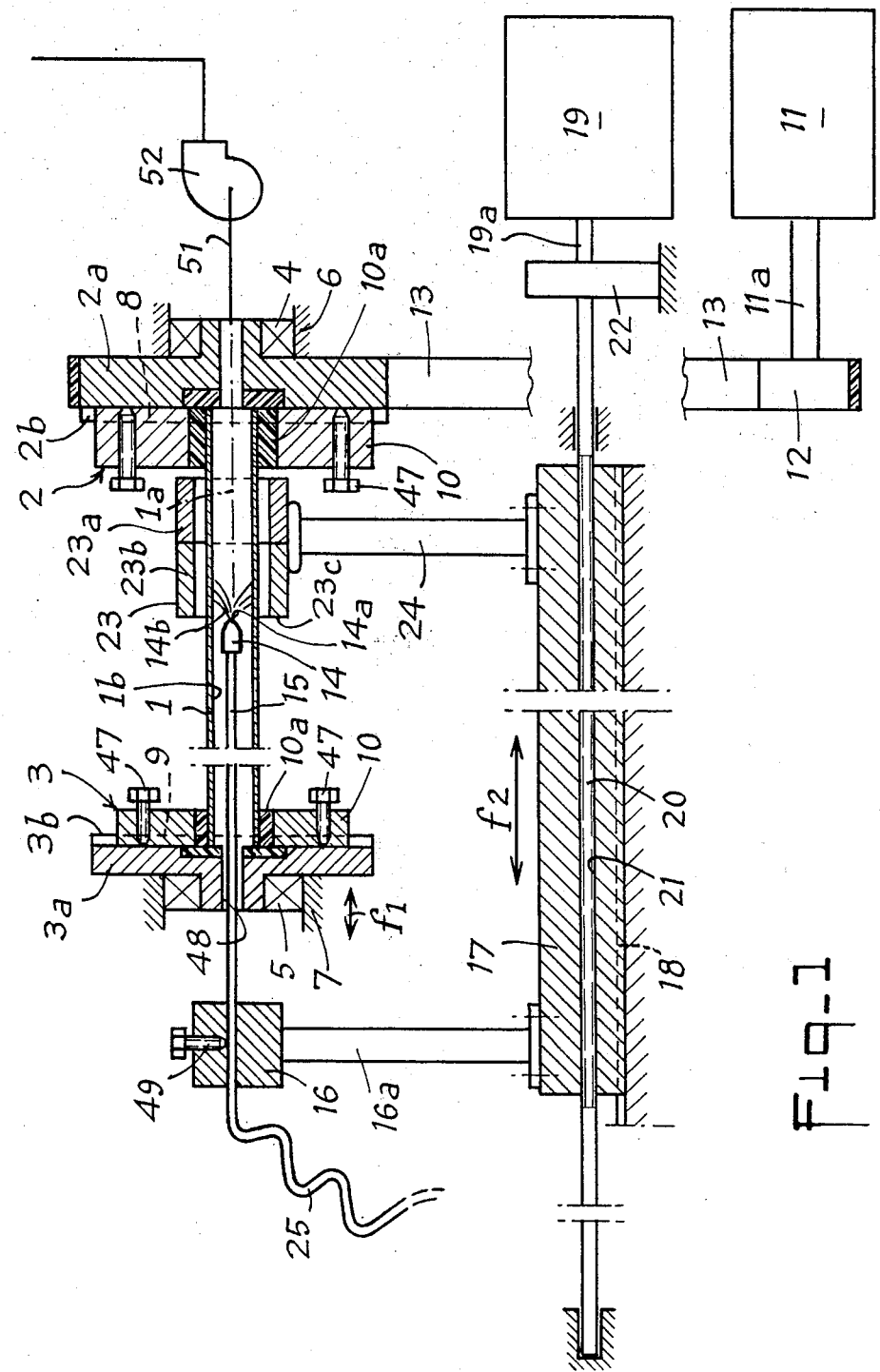
Fig_1

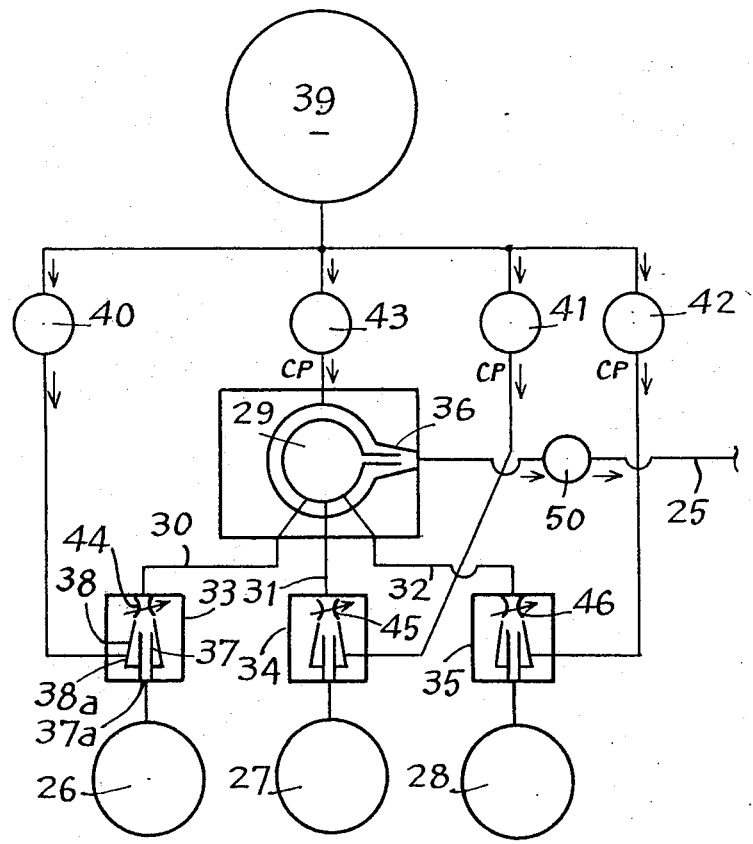
Fig_2

METHOD AND APPARATUS FOR THE PRODUCTION OF PREFORMS FOR OPTICAL FIBRES

This application is a continuation-in-part of Ser. No. 050,142, June 19, 1979, abandoned.

The present invention concerns a method for the production of a preform with a view to obtain an optical fibre with index jump or gradient by forming layers of doped transparent substance on the surface of an elongated substrate made of the said substance in the pure or doped state, of the type wherein a solution of the said substance and at least one doping agent in a solvent is spread on the substrate, which substrate is simultaneously driven in rotation about its axis at high speed in order to distribute the said solution evenly over the surface of said substrate, the said substrate being heated to cause the evaporation of the solvent, leaving on the substrate a layer which is densified by heat treatment, this operation being repeated as many times as is necessary to obtain the required number of layers.

The object of the present invention is to propose a method of the aforesaid type, which can be carried out in an installation of simple design and permits to obtain layers with uniform optical properties, and showing no defects—or inhomogeneities—which could reduce the performances of the optical fibres obtained from the preforms.

This object is reached according to the invention due to the fact that the solution is spread in sequential manner on successive parts of the substrate and that each of the said parts starts to be heated at the moment when the solution is spread on it.

Advantageously, the solution is deposited on to the substrate by spraying.

Advantageously, a substrate made of silica is used.

Advantageously, several solutions are sprayed simultaneously, the rates of spray of which are controlled separately to obtain the desired concentrations of doping agents.

Advantageously, the substrate is first heated at temperatures varying between 200° and 800° C. to evaporate the solvent, and then at temperatures varying between 500° C. and 2000° C. to densify the layer.

This method is advantageously used in an installation which, according to the invention, is characterized in that it comprises means for supporting a substrate of elongated shape and for driving it in rotation about its axis, means for spraying a solution containing the substance constituting the substrate and a doping agent over the substrate, and means for heating the said substrate, and in that the said spraying and heating means are movable in the same distance with respect to the substrate and in the direction of the axis thereof.

Advantageously, the heating means comprise two parts axially offset according to the axis of the substrate, the said parts supplying different flux of heat.

Advantageously, the support means are arranged so as to maintain the axis of the substrate horizontal.

The invention will be more readily understood on reading the following description with reference to the accompanying drawings:

FIG. 1 is a partial elevational and cross-sectional diagram of an installation according to one embodiment of the invention; and FIG. 2 is a diagram of a device for supplying the spraying liquid to be used in the installation of FIG. 2, according to one embodiment of the invention.

The illustrated invention comprises: (a) means for supporting a silica tube 1 so that its axis is horizontal and for rotating the said tube at high speed, about its axis 1a, (b) means for spraying on the inner surface 1b of said tube 1 a liquid containing silica $SiO_2$, in solution in a solvent, and in some cases, added with another so-called doping substance, which can be boron oxide $B_2O_3$, phosphorous oxide $P_2O_5$ and more generally a compound of germanium, titanium, aluminium, arsenic, niobium, antimony, etc., and (c) means for heating the wall of tube 1 as soon as a certain quantity of the said liquid has been sprayed on to the inner surface 1b of the said wall.

In the example shown in FIG. 1, the support and rotation means comprise two mutually co-axial mandrels 2 and 3 each one provided with a rotary support 2a, 3a mounted for rotation about its axis on a bearing 4, 5 of a framework 6, 7; each support 2a, 3a is provided, on its side face 2b, 3b oriented towards the other support 3a, 2a, with a plurality of dovetail guides—or grooves—8, 9 radially arranged, and on each one of which is slidably mounted a jaw 10 provided, on its end adjacent the rotation axes of the mandrels 2, 3, with a resilient endpiece 10a.

The mandrel 2 is axially fixed and can be driven in rotation by a motor 11 via a transmission means comprising a pulley 12 keyed on to the output shaft 11a of the motor 11, and a belt 13 passing over the pulley 12 and over the support 2a acting as a pulley.

The mandrel 3 is mounted on a frame of the installation, the position of which frame is axially adjustable; this is symbolized in FIG. 1 by the double arrow $f_1$ situated close to the frame 7 which carries the bearing 5 supporting the mandrel 3.

The spraying means consist of a nozzle 14 mounted at the free end of a rigid support rod 15 acting as a conduit for supplying the spraying liquid to the nozzle 14; the rod 15 is supported by an element 16 mounted on another rod 16a, the assembly 16, 16a being mounted on a carriage 17 movable in horizontal translation (doubled arrow $f_2$) on a slide 18 of the installation frame. Said carriage 17 can be driven in translation by a motor 19, via a worm 20 which is screwed into a tapping 21 of the carriage 17, which can be coupled to the output shaft 19a of the motor 19, via a regulator 22.

The means for heating the pipe 1 consists in a tubular furnace 23 which is meant to be traversed by the tube to be heated 1. Said furnace 23 is supported by a column 24 which is itself mounted on the carriage 17. Said furnace 23 comprises a first section 23a situated on the right in FIG. 1, and a second section 23b situated on the left in said figure. The section 23a supplies a thermal flux which is superior to that supplied by the other part 23b.

The nozzle 14 is situated, with respect to the furnace 23, so that only the sprays 14a of liquid sent from the said nozzle 14 are surrounded by the furnace 23. In this way, the liquid which has not been sprayed and which is still in the rod 15 or in the nozzle 14, is virtually not heated.

The spraying means 14, 15 are supplied with spraying liquid by means of a flexible tube 25, from a device which is diagrammatically shown in FIG. 2.

As can be seen on that Figure, the said device comprises a reservoir 26 of $SiO_2$ solution, a reservoir 27 of $SiO_2 + P_2O_5$ solution, and a reservoir 28 of $SiO_2 + B_2O_3$ solution. Each reservoir 26 to 28 is connected to a mixing chamber 29 via respective pipes 30, 31, 32, on which is interposed a flow-controlling and suction drive—or flowing—device 33, 34, 35.

The mixing chamber 29 is connected to the flexible tube 25 via a suction drive—or flowing—device 36. In the illustrated example, the driving devices 33 to 36 are of the Venturi effect type: each one of them comprises a nozzle 37 supplied with fluid through its end or inlet 37a, the said nozzle issuing into the neck of a ventury tuyere supplied, through its wide section end 38a, with a driving gas coming from a compressed gas storage tank 39; a servo-valve 40 to 43 permits to control independently the pressure of the driving gas supplied to each driving device 33 to 36. The valves 40 to 43 are so-called constant pressure outlet valves, i.e. valves which maintain a constant pressure at their downstream end. An adjustable constriction 44 to 46 makes it possible to control independently the flow of liquid supplied by each one of the liquid reservoirs 26 to 28.

The installation described in the foregoing operates as follows:

The silica tube 1 (see FIG. 1) is placed between the mandrels 2, 3, where each end of said tube is clamped in position between the jaws 10, said latter being secured on the supports 2a, 3a by tightening the locking screws 47. In that position, the tube 1 is co-axial to the rotary supports 2a, 3a.

The rod 15 provided with the nozzle 14 is inserted into the tube 1 through an axial opening 48 in the mandrel 3. The furnace 23 being placed near the mandrel 2 and being traversed co-axially by the pipe 1, the position of the nozzle 14 is adjusted, as shown in FIG. 1, so that the free end 14a of the nozzle 14 comes flush with the plane of the end face 23c, on the side of section 23b, of the furnace 23. Said relative position of the nozzle 14 with respect to the furnace 23 is secured by tightening a set screw 49 provided on the support 16.

Several successive layers, each one having a different index of refraction, are then deposited on the inner face 1b of tube 1, in the following manner;

First of all, for each layer to be deposited, the doping agent content in the sprayed solution is set by suitably adjusting the members 40 to 42 and 43 to 45; secondly, an output valve 50 situated between the device 36 and the flexible tube 25 is closed before the rod 15 provided with the nozzle 14 is inserted in the tube 1.

When the elements 14, 15 are in position inside the tube 1, said tube is driven in rotation about its axis 1a by the motor 11. The valve 50 is then open whilst the motor 19 is started off. The carriage 17 will then be moving slowly towards the left, driving with it the nozzle 14 and the furnace 23. The nozzle 14 is such that the spray of liquid 14b strikes the wall 1b in the region surrounded by the part 23b of the furnace 23. The nozzle 14 is arranged so that said spray 14b is annular-shaped, that is to say that no liquid is sprayed by said nozzle 14 in directions axial or adjacent to the axis 1a of the tube 1.

The liquid film thus deposited is immediately dried, then densified and vitrified by the furnace 23 in the following way:

The first section 23b of the furnace ensures the evaporation of the solvent by bringing the part of the pipe wall which it surrounds to a temperature going typically from 200° C. to 800° C.

The second section (23a) of the furnace brings the portion of pipe wall which it surrounds to a temperature going typically from 500° C. to 2000° C., to allow the densification or the vitrification of the deposited film.

It will be noted that the inside volume of the pipe 1 is isolated from the outside atmosphere, this preventing any dust or other impurities from getting into the film. The volatile gases resulting from the baking of the deposited films can be discharged through a conduit 51 on which is fitted a fan 52.

It is possible, by adjusting the spraying pressure with the valve 50 and the rates of flow with the flow-meters 33 to 35, to control the contents of the different oxides, the pure $SiO_2$ solution being used to modify the concentrations of the two doping agents, phosphorus and boron.

The spraying system will sweep over the whole length of the tube 1, said pipe rotating about its axis; the speeds will be selected so that the spraying is perfectly even. The heating element 23 follows the sweeping action of the spray and its mission is to evaporate the solvents of the solution and to crystallize the layers of pure silica and metal oxide directly these are deposited.

The present method is used for producing preforms made preferably in silica, and in which one only or two doping agents are incorporated, such as boron to lower the index, or germanium to raise it, the said doping agents being given by way of example.

What is claimed is:

1. An apparatus for producing an optical fiber with index gradient, said optical fiber including an elongated tubular substrate having one or more layers of doped transparent substance thereon, said apparatus comprising:

support means connectable to a first and second end of said tubular substrate for supporting said tubular substrate;

means for rotating said support means whereby said tubular substrate is rotated about its axis;

spray means for applying said doped transparent substance to said tubular substrate in a well-defined spray stream;

heat means disposed adjacent said spray means for heat treating said doped substrate applied to said tubular substrate; and means for moving said spray means and heat means in common between said tubular substrate first and second ends whereby said doped transparent substance is applied and heat treated along the length of said tubular substrate to provide said layer of doped transparent substance thereon.

2. An apparatus according to claim 1 wherein said spray means includes a spray nozzle disposed on the inside of said tubular substrate and said heat means includes a tubular furnace surrounding a portion of said tubular substrate adjacent said spray nozzle.

3. An apparatus according to claim 2 wherein said tubular furnace includes a low temperature portion and a high temperature portion, said high temperature portion being located relative said spray nozzle and low temperature portion so that said doped transparent substance applied to said tubular substrate is heated by said high temperature portion subsequent to heating by said low temperature portion.

4. An apparatus according to claim 2 wherein said means for common movement of said spray means and heat means includes a carriage which is movable parallel to the axis of said tubular substrate when said tubular substrate is mounted by said support means, said carriage having said spray means and heating means mounted thereon in fixed relation.

5. A method for producing an optical fiber with index gradient, said optical fiber including an elongated tubular substrate having one or more layers of doped transparent substance thereon, said method including the steps of:
supporting said tubular substrate by its first and second ends;
rotating said tubular substrate about its axis;
applying a layer of said doped transparent along the length of said tubular substrate by moving a well-defined spray stream of said substance between said tubular substrate first and second ends; and
heat treating said doped transparent substance by localized heating of said tubular substrate adjacent said well-defined spray stream as said spray stream is moved between said ends of said tubular substrate.

6. A method according to claim 5 wherein said method is repeated more than once to obtain the desired number of layers of doped transparent substance.

7. A method according to claim 5 wherein said well-defined spray stream is provided by a spray nozzle disposed within said tubular substrate to apply said doped transparent substance to the inside of said tubular substrate and said heating is provided by a tubular furnace surrounding the outside of said tubular substrate adjacent said spray nozzle, said furnace and spray nozzle being movable between said tubular substrate ends in common only.

8. The method according to claim 7 wherein said doped transparent substance is first heated to a temperature of between about 200 degrees C. and 800 degrees C. by a forward section of said tubular furnace and subsequently heated to a temperature of between about 500 degrees C. and 2000 degrees C. by a rearward section of said tubular furnace.

9. A method for the production of a preform designed for the obtention of an optical fiber with index gradient by forming layers of a doped transparent substance on a surface of an elongated tubular substrate, said tubular substrate including said substance in a pure or doped stated, said method comprising the steps of:
rotating said tubular substrate about its axis;
feeding spraying means with a solution of said substance and at least one doping agent in a solvent while continuously advancing said spraying means along the surface of said rotating tubular substrate so as to spread said solution evenly on said surface;
continuously advancing heating means along said surface in synchronism with said spraying means so as to heat the region of said surface being stricken by the sprayed solution with a forward section of said heating means to a temperature of between about 200 degrees C. and 800 degrees C. to cause immediate evaporation of said solvent and continuing to heat said region with a rearward section of said heating means to a temperature of between about 500 degrees C. and 2000 degrees C. to densify said substance and doping agent left on said surface after evaporation of the solvent.

10. A method according to claim 8 wherein the method is repeated more than once to obtain the desired number of layers of doped transparent substance.

* * * * *